United States Patent
Kidokoro et al.

(10) Patent No.: US 6,691,675 B2
(45) Date of Patent: Feb. 17, 2004

(54) WARM-UP CONTROL APPARATUS AND WARM-UP CONTROL METHOD FOR INTERNAL COMBUSTION ENGINE

(75) Inventors: Toru Kidokoro, Hadano (JP); Keizo Hiraku, Susono (JP); Hiroshi Kanai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 34 days.

(21) Appl. No.: 10/124,372

(22) Filed: Apr. 18, 2002

(65) Prior Publication Data

US 2002/0160879 A1 Oct. 31, 2002

(30) Foreign Application Priority Data

Apr. 27, 2001 (JP) ........................................ 2001-133221

(51) Int. Cl.⁷ .................................................. F02P 5/00
(52) U.S. Cl. ..................... 123/329; 123/399; 123/406.5
(58) Field of Search ............................ 123/329, 406.5, 123/406.51, 406.52, 406.53, 406.72, 399

(56) References Cited

U.S. PATENT DOCUMENTS 6,321,716 B1 * 11/2001 Mashiki et al. ............. 123/295
6,557,524 B2 * 5/2003 Tsunooka ................... 123/399
6,568,175 B2 * 5/2003 Izumiura et al. .............. 60/284
2003/0116131 A1 * 6/2003 Majima et al. ......... 123/406.53

FOREIGN PATENT DOCUMENTS

| JP | A 5-26138 | 2/1993 | |
| JP | A 11-93813 | 4/1999 | |
| JP | 327639 | * 11/2002 | ........... F02D/41/06 |

* cited by examiner

Primary Examiner—Mahmoud Gimie
Assistant Examiner—Hai Huynh
(74) Attorney, Agent, or Firm—Oliff & Berridge, PLC

(57) ABSTRACT

A warm-up control apparatus of an internal combustion engine is installed in a vehicle equipped with a brake booster that uses a negative pressure in an intake pipe of the internal combustion engine. The apparatus performs a warm-up control of the engine by retarding the ignition timing and increasing the amount of intake air. If during execution of the warm-up control, the brake pedal is operated, or the accelerator is off while the vehicle is running at or above a predetermined speed, or the decreasing rate of the amount of accelerator operation is greater than or equal to a predetermined value while the vehicle is running at or above a predetermined speed, the control apparatus recovers the intake pipe negative pressure by reducing the amount of intake air set in relation to the warm-up control.

22 Claims, 5 Drawing Sheets

WARM-UP CONTROL APPARATUS AND WARM-UP CONTROL METHOD FOR INTERNAL COMBUSTION ENGINE

INCORPORATION BY REFERENCE

The disclosure of Japanese Patent Application No. 2001-133221 filed on Apr. 27, 2001 including the specification, drawings and abstract is incorporated herein by reference in its entirety.

BACKGROUND OF THE INVENTION

1. Field of the Invention

The invention relates to a warm-up control apparatus and a warm-up control method for an internal combustion engine. More particularly, the invention relates to a warm-up control apparatus which is installed in a vehicle equipped with a brake booster that uses negative pressure in an intake pipe of an internal combustion engine and which performs a warm-up control of the engine by retarding the ignition timing and increasing the amount of intake air, and to a warm-up control method.

2. Description of the Related Art

Internal combustion engines adopt an ignition timing retarding control for improving a warm-up characteristic of a catalyst provided in an engine exhaust system. This control is based on a fact that if the ignition timing is retarded, the combustion end timing is retarded and the combustion speed reduces, so that the exhaust heat loss increases and a high-temperature exhaust gas is supplied to the catalyst, and therefore early warm-up of the catalyst can be achieved. Retardation of the ignition timing involves a reduction in engine torque. Therefore, in general, when the ignition timing retarding control is executed, a control of increasing the amount of intake air is simultaneously executed in order to prevent reduction of engine torque (see, for example, Japanese Patent Application Laid-Open Nos. 5-26138 and 11-93813, etc.).

Brake boosters are widely employed in vehicles in order to reduce the brake pedal operating force at the time of a braking operation. A typical brake booster uses the intake negative pressure of the engine as a boost power source. During execution of the warm-up control involving an increase in the amount of intake air and a retardation of the ignition timing, the intake pipe negative pressure tends to become low or insufficient, and therefore the brake performance reduces. Therefore, during execution of the warm-up control, an unpleasant braking feel may result when the brake is operated.

SUMMARY OF THE INVENTION

Accordingly, it is an object of the invention to provide a warm-up control apparatus and a warm-up control method for an internal combustion engine that are able to secure a good braking performance by restraining a warm-up control at the time of a braking operation during execution of the warm-up control.

In order to achieve the aforementioned object, a first aspect of the invention provides a warm-up control apparatus of an internal combustion engine and a warm-up control method, in which a brake booster that uses a negative pressure in an intake pipe of the internal combustion engine is provided, and a warm-up control of the internal combustion engine is performed by retarding an ignition timing and increasing an amount of intake air. The amount of intake air set in relation to the warm-up control is reduced if a brake pedal is operated during execution of the warm-up control.

In the warm-up control apparatus and the warm-up control method in the first aspect of the invention, the amount of intake air increased by the warm-up control is reduced simultaneously with detection of an operation of the brake pedal, so that the intake pipe negative pressure will be recovered. Therefore, although there is a slight delay in timing, the negative pressure for use by the brake booster is secured, and reduction in the brake performance can be curbed.

In a warm-up control apparatus and a warm-up control method of an internal combustion engine in accordance with a second aspect of the invention, a brake booster that uses a negative pressure in an intake pipe of the internal combustion engine is provided, and a warm-up control of the internal combustion engine is performed by retarding an ignition timing and increasing an amount of intake air. In the warm-up control apparatus and the warm-up control method, the amount of intake air set in relation to the warm-up control is reduced if an accelerator is off while a vehicle is running at or above a predetermined vehicle speed during execution of the warm-up control.

If the accelerator is off while the vehicle is running at or above a predetermined vehicle speed, there is a possibility of operation of the brake. In the second aspect, therefore, the amount of intake air increased by the warm-up control is reduced simultaneously with detection of the accelerator-off state, so that the intake pipe negative pressure will be recovered at an earlier timing. Therefore, a good braking performance is secured, and good preparation for a braking operation is made.

In a warm-up control apparatus and a warm-up control method of an internal combustion engine in accordance with a third aspect of the invention, a brake booster that uses a negative pressure in an intake pipe of the internal combustion engine is provided, and a warm-up control of the internal combustion engine is performed by retarding an ignition timing and increasing an amount of intake air. In the warm-up control apparatus and the warm-up control method, the amount of intake air set in relation to the warm-up control is reduced if a decreasing rate of an amount of accelerator operation is greater than or equal to a predetermined value while a vehicle is running at or above a predetermined vehicle speed during execution of the warm-up control.

If the decreasing rate of the amount of accelerator operation is greater than or equal to a predetermined value while the vehicle is running at or above a predetermined vehicle speed, there is a high probability of operation of the brake. In the third aspect, therefore, the amount of intake air increased by the warm-up control is reduced simultaneously with detection of such a reduction in the amount of accelerator operation, so that the intake pipe negative pressure will be recovered at a further earlier timing. Therefore, a good braking performance is secured, and good preparation for a braking operation is made.

In a warm-up control apparatus and a warm-up control method of an internal combustion engine in accordance with a fourth aspect of the invention, a brake booster that uses a negative pressure in an intake pipe of the internal combustion engine is provided, and a warm-up control of the internal combustion engine is performed by retarding an ignition timing and increasing an amount of intake air. In the warm-up control apparatus and the warm-up control method, the amount of intake air set in relation to the warm-up control is reduced if an increasing rate of a degree of throttle opening is greater than or equal to a predetermined value during execution of the warm-up control.

If the increasing rate of the degree of throttle opening is greater than or equal to a predetermined value, the warm-up is rapidly accelerated, so that there is a danger of overheat of the catalyst and restraint of the warm-up control will not cause a problem. In this aspect, the amount of intake air increased by the warm-up control is reduced simultaneously with detection of such an increase in the degree of throttle opening, so that the intake pipe negative pressure will be recovered. Therefore, a good braking performance is ensured beforehand, and good preparation for a braking operation is made.

In a warm-up control apparatus and a warm-up control method of an internal combustion engine in accordance with a fifth aspect of the invention, a brake booster that uses a negative pressure in an intake pipe of the internal combustion engine is provided, and a warm-up control of the internal combustion engine is performed by retarding an ignition timing and increasing an amount of intake air introduced into the engine via the intake pipe. In the warm-up control apparatus and the warm-up control method, the amount of intake air set in relation to the warm-up control is reduced if during execution of the warm-up control, the brake booster uses the negative pressure in the intake pipe or there is a possibility of the brake booster using the negative pressure.

According to the warm-up control apparatus and the warm-up control method in the fifth aspect, if the brake booster uses the negative pressure or there is a possibility of the brake booster using the negative pressure, for example, if a brake operation or the like occurs, the amount of intake air increased by the warm-up control is reduced, so that the intake pipe negative pressure will be well recovered and good braking performance will be secured.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter with reference to the accompanying drawings.

Figure 1:
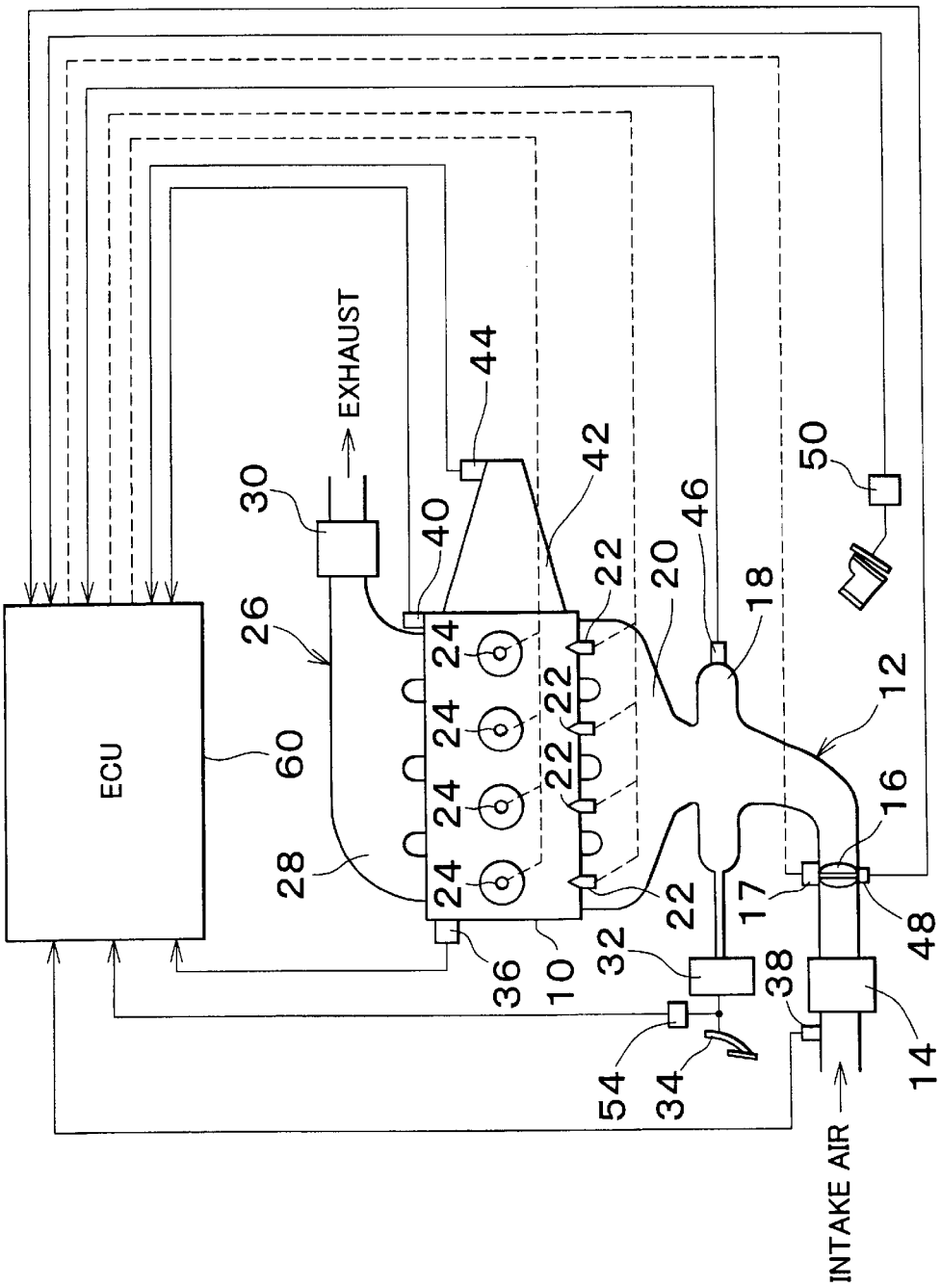
FIG. 1 is a schematic diagram of an overall construction of an internal combustion engine equipped with a warm-up control apparatus in accordance with the invention.

FIG. 1 is a schematic diagram of an overall construction of an internal combustion engine equipped with a warm-up control apparatus in accordance with the invention. An engine 10 is an in-line multi-cylinder four-stroke cycle reciprocating gasoline engine installed in a vehicle. An intake passage 12 is connected to intake ports of the engine 10. The intake passage 12 is provided with an air cleaner 14, a throttle valve 16, a surge tank 18, an intake manifold 20, etc. In this embodiment, the throttle valve 16 is a generally termed electronic throttle that is not directly mechanically connected to an accelerator pedal provided near a driver's seat but is driven by a throttle motor 17.

Air outside the engine 10 (external air) sequentially passes through the portions 14, 16, 18 and 20 of the intake passage 30 toward a combustion chamber of each cylinder. The intake manifold 20 is provided with injectors 22 that inject fuel toward the intake ports. To ignite air-fuel mixture in the cylinders, a cylinder head is provided with ignition plugs 24. After combustion of mixture gas, exhaust gas is led through an exhaust port 10 and an exhaust passage 26 that includes an exhaust manifold 28, a catalyst converter 30, etc., and is discharged out into the atmosphere.

A brake booster 32 is a device for reducing the force needed to operate a brake pedal 34. The brake booster 32 acquires its boost power source from the negative pressure in the surge tank 18.

The vehicle is equipped with various sensors. Among the sensors of the vehicle, sensors related to this embodiment will be described. A water temperature sensor 36 for detecting the temperature THW of cooling water of the engine 10 is attached to the cylinder block of the engine 10. An intake temperature sensor 38 for detecting the temperature THA of intake air is provided near the air cleaner 14 in the intake passage.

A crank angle sensor 40 that generates rotation speed detecting pulses for detecting the rotation speed (number of rotations) NE of a crankshaft is provided. A vehicle speed sensor 44 that generates a number of output pulses per unit time that is proportional to the rotation speed of an output shaft of a transmission 44, that is, the vehicle speed SPD.

The surge tank 18 is provided with an intake pressure sensor 46 for detecting the pressure PM inside the surge tank 18. Provided near the throttle valve 16 in the intake passage 12 are a throttle opening sensor 48 that detects the turning angle TA of a shaft of the throttle valve 16 and an accelerator operation amount sensor 50 that detects the amount of depression of the accelerator pedal (amount of accelerator operation) ACP. A brake pedal sensor 54 is provided near the brake pedal 34 for detecting the amount of depression of the brake pedal 34.

An electronic control unit (ECU) 60 is a microcomputer system that executes an intake air amount control, a fuel injection control, an ignition timing control, etc. The ECU 60 inputs signals from various sensors, and executes processing operations based on the input signals. On the basis of results of operations, the ECU 60 outputs control signals to the throttle motor 17, the injectors 22, the ignition plugs 24, etc.

In this internal combustion engine, a warm-up control based on an increase in the amount of intake air and retardation of the ignition timing is executed. However, during execution of the warm-up control, the intake pipe negative pressure tends to be insufficient, and therefore, the braking performance drops, as mentioned above. In this invention, therefore, at the time of a braking operation during execution of the warm-up control, a good braking performance is secured by restraining the warm-up control. A warm-up control taking the braking operation into account will be described below.

Figure 2:
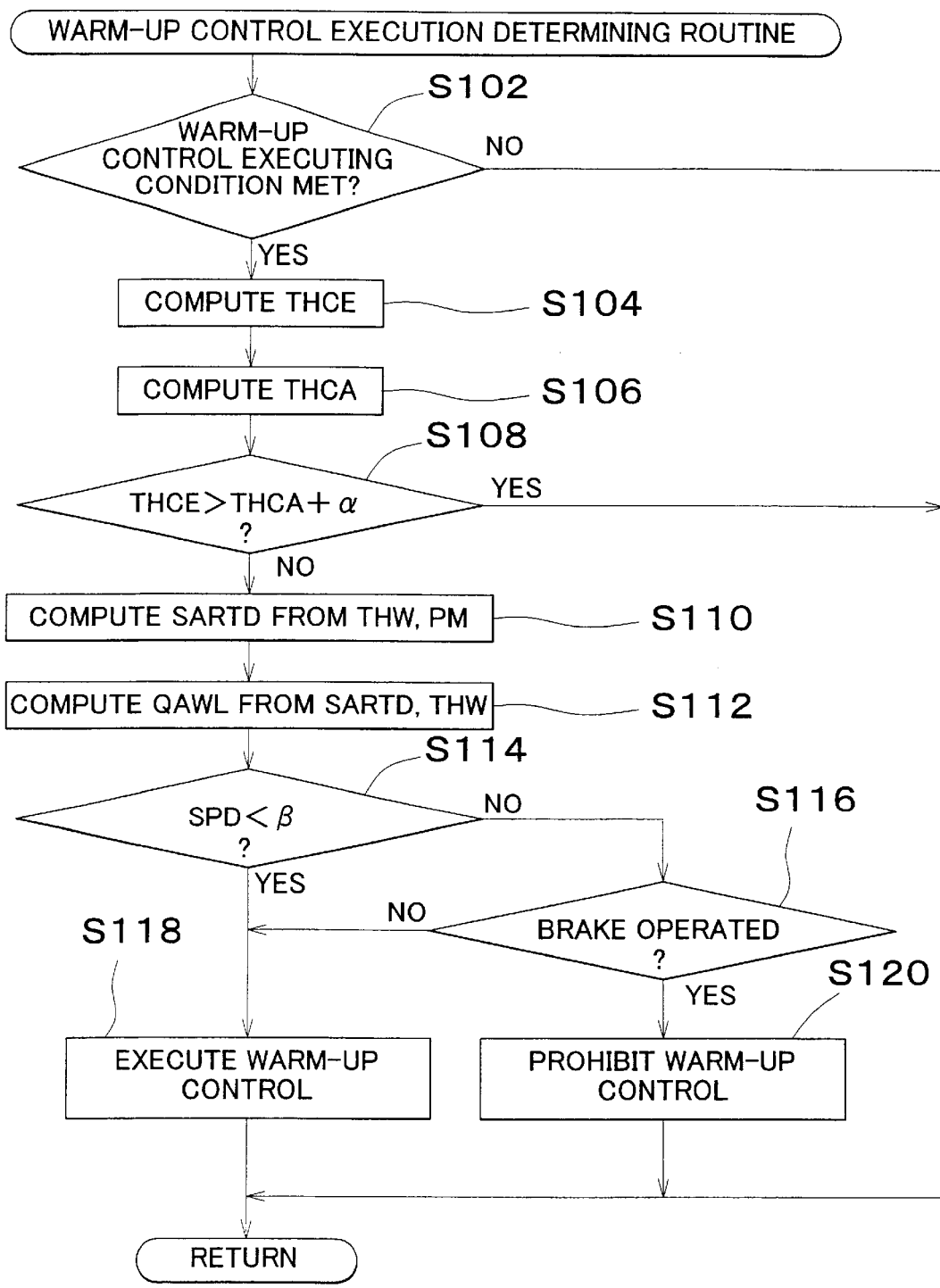
FIG. 2 is a flowchart illustrating a procedure of a warm-up control execution determining routine in accordance with a first embodiment of the invention.

FIG. 2 is a flowchart illustrating a procedure of a warm-up control execution determining routine in accordance with the first embodiment of the invention. This routine is executed by the ECU 60 in a predetermined time cycle after the engine is started. In the first embodiment, the amount of intake air increased by the warm-up control is reduced simultaneously with detection of operation of the brake pedal so as to recover an intake pipe negative pressure, so that a good braking performance will be secured although there may be a slight delay in timing.

First in step 102, it is determined whether after the engine is started, a condition for executing the warm-up control is met. The condition may be based on the engine cooling water temperature THW, or the like. If the condition is not met, this routine ends. Conversely, if the condition is met, the process proceeds to step 104.

In step 104, an estimated catalyst temperature THCE is computed. This computation uses a cumulative amount of intake air or a combination of the cumulative amount of intake air and the intake temperature THA, the rotation speed NE, the intake pressure PM as engine load, etc.

Subsequently in step 106, a catalyst activation temperature THCA is computed. The catalyst activation temperature THCA may be a fixed value. However, in this embodiment, the catalyst activation temperature THCA is computed based on a degree of catalyst deterioration and a target air-fuel ratio during a fast idling operation. The target air-fuel ratio is determined by the intake temperature THA, the engine cooling water temperature THW at the time of startup, etc. The degree of catalyst deterioration is separately determined during an air-fuel ratio feedback control.

Subsequently in step 108, it is determined whether the estimated catalyst temperature THCE is higher than a reference value obtained by adding a constant value α to the catalyst activation temperature THCA. If the estimated catalyst temperature THCE is higher than the reference value THCA+α, it is considered that the warm-up control is not needed, and the routine is ended. Conversely, if the estimated catalyst temperature THCE is less than or equal to the reference value THCA+α, it is considered that the warm-up control is needed, and the process proceeds to step 110.

In step 110, a timing retardation correction amount SARTD with respect to a basic ignition timing separately determined from an engine operation state is computed based on the present engine cooling water temperature THW and the present intake pressure PM (engine load). A map provided beforehand for this computation is designed so that the timing retardation correction amount attenuates as the water temperature increases, taking the warm-up state of the engine and the catalyst into consideration.

Subsequently in step 112, an increase correction amount QAWL with respect to the amount of intake air is computed based on the timing retardation correction amount SARTD and the water temperature THW. A map provided beforehand for this computation is similarly designed so that the increase correction amount attenuates as the water temperature increases, and the increase correction amount increases as the timing retardation correction amount increases, taking the warm-up state of the engine and the catalyst.

Subsequently in step 114, it is determined whether the vehicle is at a stop or is running in a low speed range or an intermediate-to-high speed range, by comparing the present vehicle speed SPD with a reference value β. If the vehicle speed SPD is less than β, that is, if the vehicle is at a stop or is running in the low speed range, there is no need for a brake assisting force, and the process proceeds to step 118, in which the warm-up control based on the correction values determined in steps 110 and 112 is executed.

Conversely, if the vehicle speed SPD is greater than or equal to β, the process proceeds to step 116, in which it is determined based on an output from the brake pedal sensor 54 whether the brake pedal is operated. If the brake pedal is not operated, the process proceeds to step 118, in which the warm-up control is executed. Conversely, if the brake pedal is operated, the process proceeds to step 120.

In step 120, the warm-up control is prohibited and discontinued in order to secure a good braking performance. By completely discontinuing the warm-up control, the intake pipe negative pressure can be sufficiently recovered, and a sufficient braking performance can be secured. Instead of completely discontinuing the warm-up control, it is also possible to continue the warm-up control with reduced correction amounts for the warm-up control.

Figure 3:
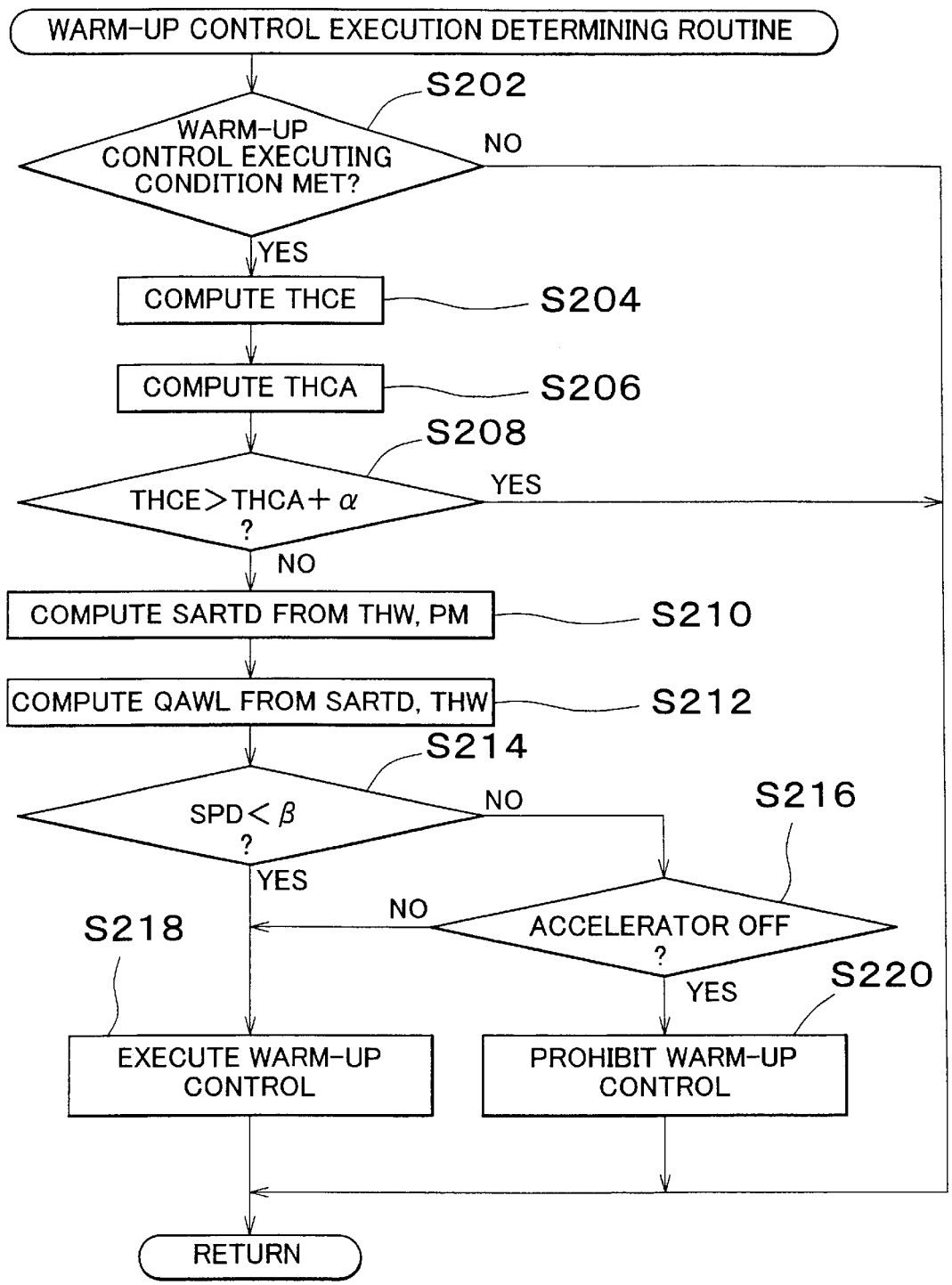
FIG. 3 is a flowchart illustrating a procedure of a warm-up control execution determining routine in accordance with a second embodiment of the invention.

FIG. 3 is a flowchart illustrating a procedure of a warm-up control execution determining routine in accordance with a second embodiment of the invention. During an off-state of the accelerator while the vehicle is running at or above a certain vehicle speed, there is a possibility that the brake may be operated. In the second embodiment, therefore, simultaneously with detection of the off-state of the accelerator, the amount of intake air increased by the warm-up control is reduced, so as to more quickly recover the intake pipe negative pressure and therefore secure a good braking performance than in the first embodiment.

The contents of processing of steps 202 to 214 and steps 218 and 220 in FIG. 3 are the same as those of steps 102 to 114 and steps 118 and 120 in FIG. 2. The content of processing of step 116 in FIG. 2 is replaced by the content of processing of step 216 in FIG. 3. That is, in step 216, it is determined whether the accelerator is in the off-state or the on-state based on the output of the accelerator operation amount sensor 50. If the accelerator is in the on-state, it is considered that the present situation is not a situation where the brake is to be operated, and the warm-up control is executed (step 218). Conversely, if the accelerator is in the off-state, it is considered that the present situation is a situation where the brake may possibly be operated, and the warm-up control is prohibited (step 220).

Figure 4:
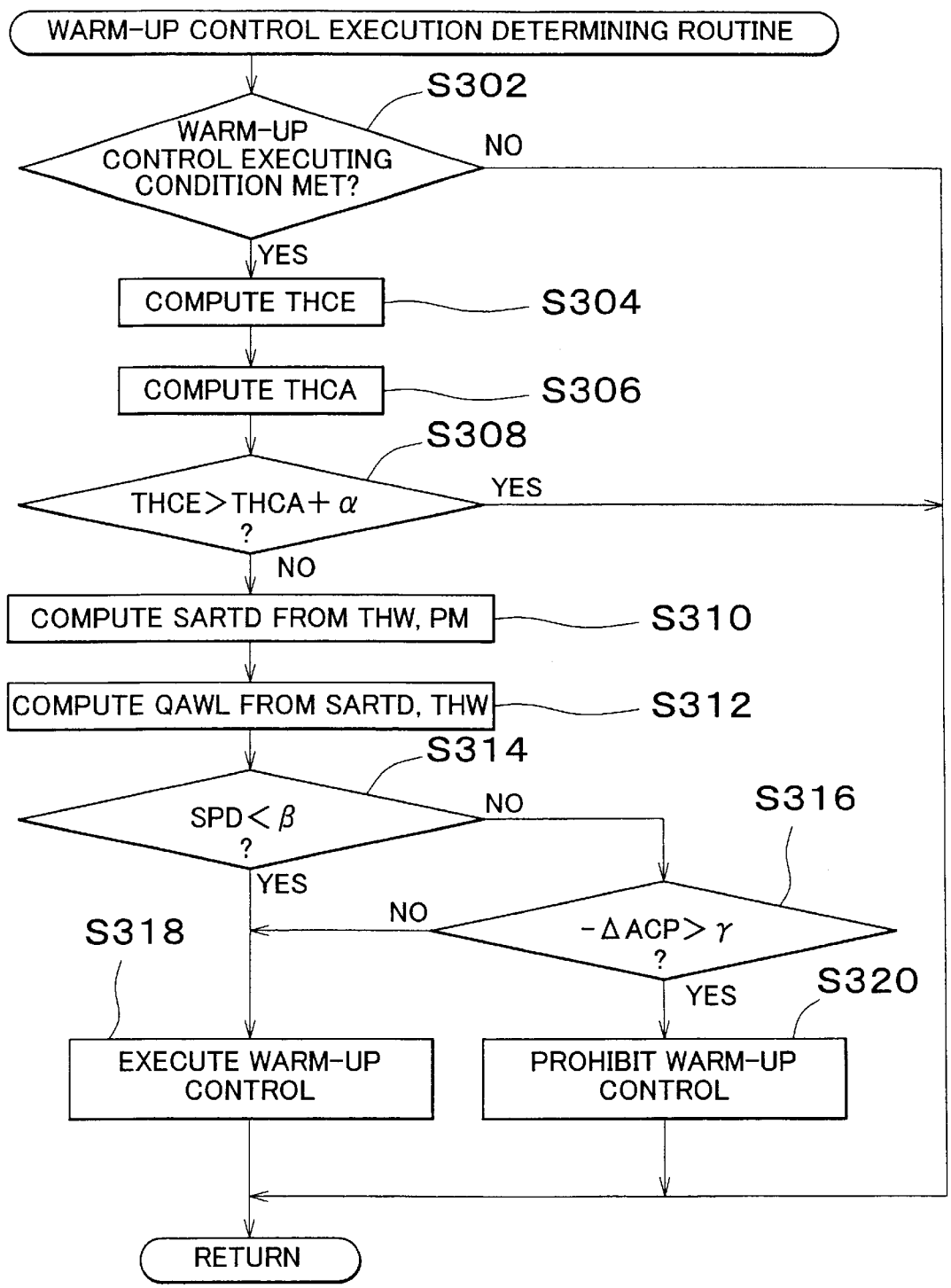
FIG. 4 is a flowchart illustrating a procedure of a warm-up control execution determining routine in accordance with a third embodiment of the invention.

FIG. 4 is a flowchart illustrating a procedure of a warm-up control execution determining routine in accordance with a third embodiment of the invention. If the decreasing rate of the amount of accelerator operation is greater than or equal to a predetermined value while the vehicle is running at or above a predetermined vehicle speed, there is a high probability of operation of the brake. In the third embodiment, therefore, simultaneously with detection of such a reduction in the amount of accelerator operation, the amount of intake air increased by the warm-up control is reduced, so as to more quickly recover the intake pipe negative pressure and secure a good braking performance than in the second embodiment.

The contents of processing of steps 302 to 314 and steps 318 and 320 in FIG. 4 are the same as those of steps 102 to 114 and steps 118 and 120 in FIG. 2. The content of processing of step 116 in FIG. 2 is replaced by the content of processing of step 316 in FIG. 4. That is, in step 316, it is determined whether the decreasing rate of the amount of accelerator operation $-\Delta ACP$ computed based on the output of the accelerator operation amount sensor 50 is greater than a predetermined value γ. If the amount of accelerator operation $-\Delta ACP$ is less than or equal to the predetermined value γ, it is considered that the present situation is not in a situation where the brake is to be operated, and the warm-up control is executed (step 318). Conversely, if the amount of accelerator operation −ΔACP is greater than the predetermined value γ, it is considered that the present situation is a situation where the brake may possibly be operated, and the warm-up control is prohibited (step 320).

Figure 5:
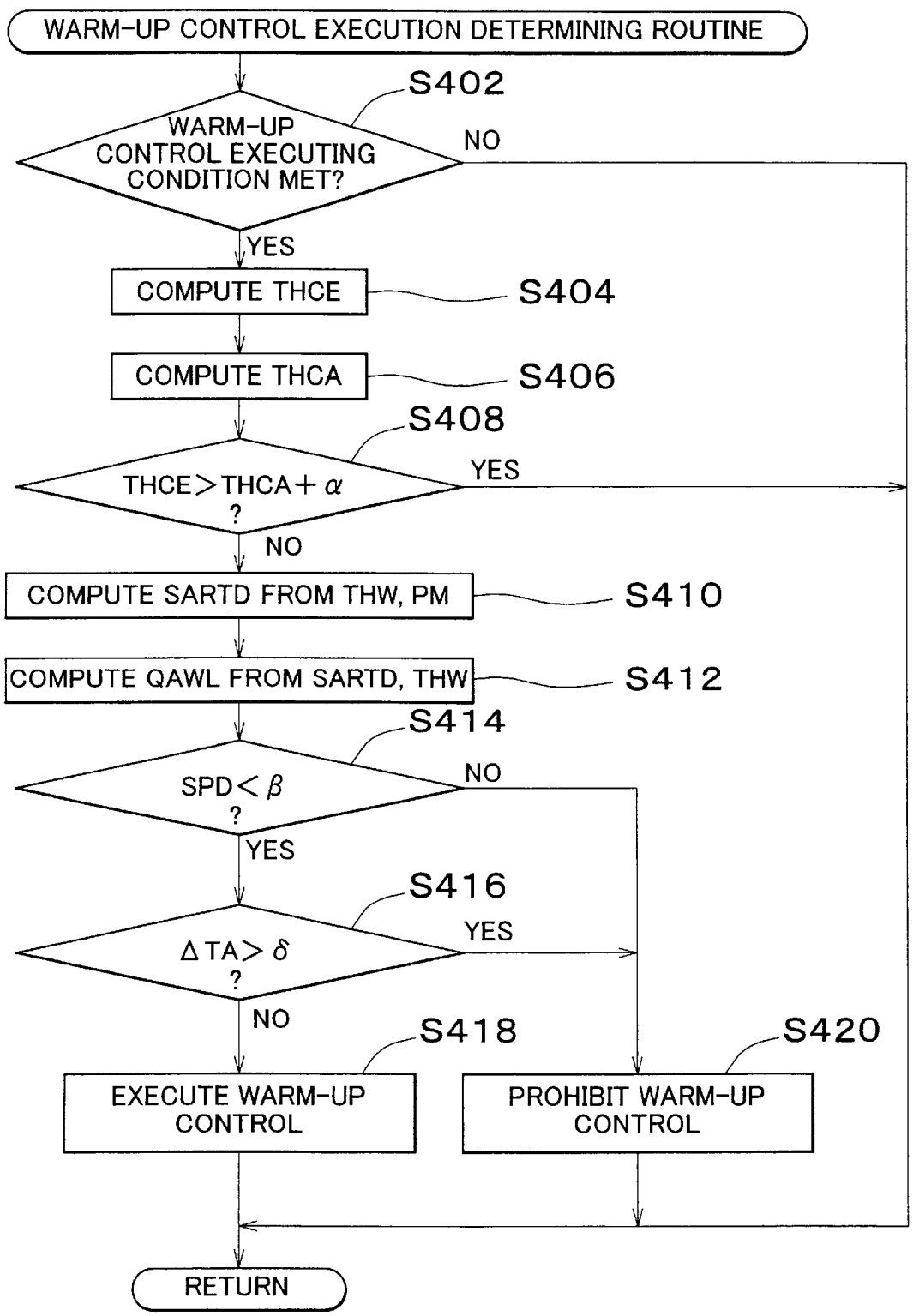
FIG. 5 is a flowchart illustrating a procedure of a warm-up control execution determining routine in accordance with a fourth embodiment of the invention.

FIG. 5 is a flowchart illustrating a procedure of a warm-up control execution determining routine in accordance with a fourth embodiment of the invention. If the increasing rate of the degree of throttle opening is greater than or equal to a predetermined value, the warm-up is sharply accelerated, so that restraint of the warm-up control does not cause a problem. In order to prevent overheat of the catalyst, the amount of intake air increased by the warm-up control is reduced simultaneously with detection of an increase in the degree of throttle opening as mentioned above, so that the intake pipe negative pressure will be recovered and a good braking performance will be ensured beforehand.

The contents of processing of steps 402 to 414 and steps 418 and 420 in FIG. 5 are the same as those of steps 102 to 114 and steps 118 and 120 in FIG. 2. In FIG. 5, there is no step corresponding to step 116 in FIG. 2, and a new step 416 is provided following step 414. That is, if it is determined in step 416 that the increasing rate ΔTA of the degree of throttle opening computed based on the output of the throttle opening sensor 48 is greater than a predetermined value δ, the warm-up control is prohibited in step 420 even though the vehicle is at a stop or is running in a low speed range.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A warm-up control apparatus of an internal combustion engine, comprising:
a brake booster that uses a negative pressure in an intake pipe of the internal combustion engine; and
a control portion which performs a warm-up control of the internal combustion engine by retarding an ignition timing and increasing an amount of intake air introduced into the internal combustion engine via the intake pipe, and which reduces the amount of intake air set in relation to the warm-up control if a brake pedal is operated during execution of the warm-up control.

2. The control apparatus according to claim 1, wherein the control portion completely discontinues the warm-up control performed based on retardation of the ignition timing and an increase in the amount of intake air.

3. The control apparatus according to claim 1, wherein the control portion secures a negative pressure in the intake pipe which is used by the brake booster, by reducing the amount of intake air set in relation to the warm-up control.

4. A warm-up control apparatus of an internal combustion engine, comprising:
a brake booster that uses a negative pressure in an intake pipe of the internal combustion engine; and
a control portion which performs a warm-up control of the internal combustion engine by retarding an ignition timing and increasing an amount of intake air introduced into the internal combustion engine via the intake pipe, and which reduces the amount of intake air set in relation to the warm-up control if an accelerator is off while a vehicle is running at or above a predetermined vehicle speed during execution of the warm-up control.

5. The control apparatus according to claim 4, wherein the control portion completely discontinues the warm-up control performed based on retardation of the ignition timing and an increase in the amount of intake air.

6. The control apparatus according to claim 4, wherein the control portion secures a negative pressure in the intake pipe which is used by the brake booster, by reducing the amount of intake air set in relation to the warm-up control.

7. A warm-up control apparatus of an internal combustion engine, comprising:
a brake booster that uses a negative pressure in an intake pipe of the internal combustion engine; and
a control portion which performs a warm-up control of the internal combustion engine by retarding an ignition timing and increasing an amount of intake air introduced into the internal combustion engine via the intake pipe, and which reduces the amount of intake air set in relation to the warm-up control if a decreasing rate of an amount of accelerator operation is greater than or equal to a predetermined value while a vehicle is running at or above a predetermined vehicle speed during execution of the warm-up control.

8. The control apparatus according to claim 7, wherein the control portion completely discontinues the warm-up control performed based on retardation of the ignition timing and an increase in the amount of intake air.

9. The control apparatus according to claim 7, wherein the control portion secures a negative pressure in the intake pipe which is used by the brake booster, by reducing the amount of intake air set in relation to the warm-up control.

10. A warm-up control apparatus of an internal combustion engine, comprising:
a brake booster that uses a negative pressure in an intake pipe of the internal combustion engine; and
a control portion which performs a warm-up control of the internal combustion engine by retarding an ignition timing and increasing an amount of intake air introduced into the internal combustion engine via the intake pipe, and which reduces the amount of intake air set in relation to the warm-up control if an increasing rate of a degree of throttle opening is greater than or equal to a predetermined value during execution of the warm-up control.

11. The control apparatus according to claim 10, wherein the control portion completely discontinues the warm-up control performed based on retardation of the ignition timing and an increase in the amount of intake air.

12. The control apparatus according to claim 10, wherein the control portion secures a negative pressure in the intake pipe which is used by the brake booster, by reducing the amount of intake air set in relation to the warm-up control.

13. A warm-up control apparatus of an internal combustion engine, comprising:
a brake booster that uses a negative pressure in an intake pipe of the internal combustion engine; and
a control portion which performs a warm-up control of the internal combustion engine by retarding an ignition timing and increasing an amount of intake air introduced into the internal combustion engine via the intake pipe, and which reduces the amount of intake air set in relation to the warm-up control if during execution of the warm-up control, the brake booster uses the negative pressure in the intake pipe or there is a possibility of the brake booster using the negative pressure.

14. The control apparatus according to claim 13, wherein the control portion completely discontinues the warm-up control performed based on retardation of the ignition timing and an increase in the amount of intake air.

15. The control apparatus according to claim 13, wherein the control portion secures a negative pressure in the intake pipe which is used by the brake booster, by reducing the amount of intake air set in relation to the warm-up control.

16. A warm-up control method of an internal combustion engine installed in a vehicle having a brake booster that uses a negative pressure in an intake pipe of the internal combustion engine, the warm-up control method comprising:

performing a warm-up control of the internal combustion engine by retarding an ignition timing and increasing an amount of intake air introduced into the internal combustion engine via the intake pipe; and reducing the amount of intake air set in relation to the warm-up control if during execution of the warm-up control it is determined that the brake booster uses the negative pressure in the intake pipe or that there is a possibility of the brake booster using the negative pressure.

17. The control method according to claim 16, wherein if the brake pedal is operated during execution of the warm-up control, it is determined that the brake booster uses the negative pressure in the intake pipe or that there is a possibility of the brake booster using the negative pressure.

18. The control method according to claim 16, wherein if an accelerator-off state is detected while a vehicle is running at or above a predetermined vehicle speed during execution of the warm-up control, it is determined that the brake booster uses the negative pressure in the intake pipe or that there is a possibility of the brake booster using the negative pressure.

19. The control method according to claim 16, wherein if a decreasing rate of an amount of accelerator operation is greater than or equal to a predetermined value while a vehicle is running at or above a predetermined vehicle speed during execution of the warm-up control, it is determined that the brake booster uses the negative pressure in the intake pipe or that there is a possibility of the brake booster using the negative pressure.

20. The control method according to claim 16, wherein in the step of reducing the amount of intake air, the warm-up control based on retardation of the ignition timing and an increase in the amount of intake air is completely discontinued.

21. The control method according to claim 16, further comprising:

recovering the negative pressure to secure braking performance.

22. A warm-up control method of an internal combustion engine installed in a vehicle having a brake booster that uses a negative pressure in an intake pipe of the internal combustion engine, the warm-up control method comprising:

performing a warm-up control of the internal combustion engine by retarding an ignition timing and increasing an amount of intake air introduced into the internal combustion engine via the intake pipe; and reducing the amount of intake air set in relation to the warm-up control if an increasing rate of a degree of throttle opening is greater than or equal to a predetermined value during execution of the warm-up control.

* * * * *